Sept. 11, 1934.　　　　G. TAUSCHEK　　　　1,973,026
MACHINE FOR UTILIZING REGISTRATION CARDS AND THE LIKE
Filed Nov. 20, 1930　　　3 Sheets-Sheet 2
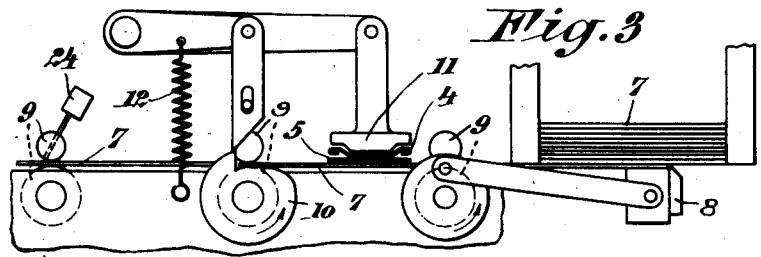
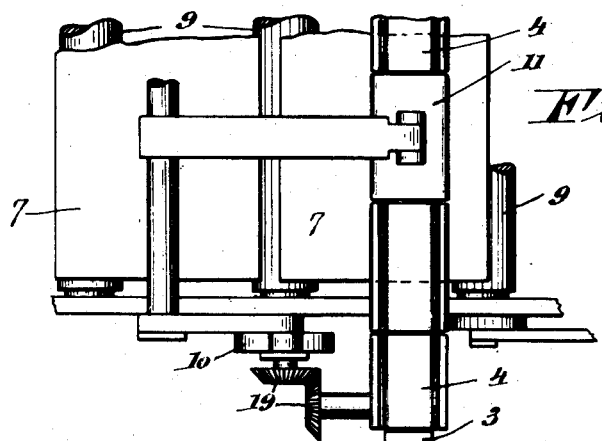
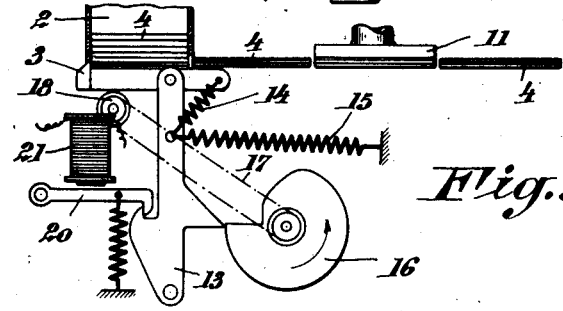

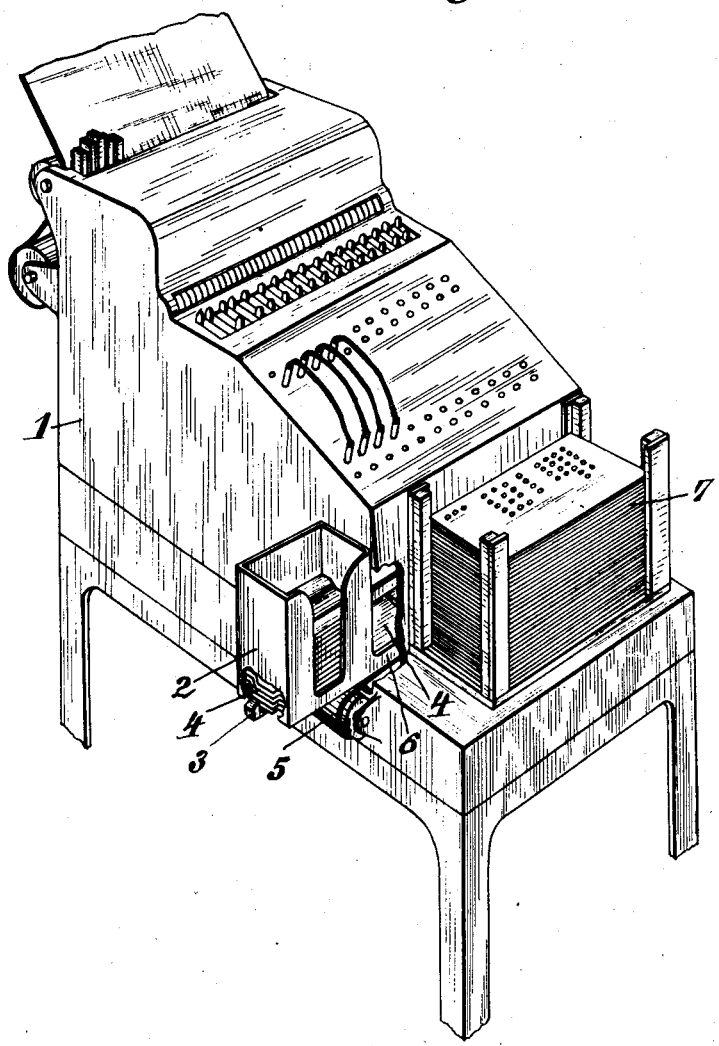

Sept. 11, 1934.   G. TAUSCHEK   1,973,026
MACHINE FOR UTILIZING REGISTRATION CARDS AND THE LIKE
Filed Nov. 20, 1930   3 Sheets-Sheet 3

INVENTOR
Gustav Tauschek
BY
ATTORNEY

UNITED STATES PATENT OFFICE

1,973,026

MACHINE FOR UTILIZING REGISTRATION CARDS AND THE LIKE

Gustav Tauschek, Vienna, Austria, assignor, by mesne assignments, to International Business Machines Corporation, New York, N. Y., a corporation of New York Application November 20, 1930, Serial No. 497,019
In Austria November 25, 1929

3 Claims. (Cl. 101—58)

This invention relates to machines of the type which employ perforated cards and the like as the controlling elements, such machines being known as tabulating and sorting machines. The improvement consists in a novel combination between printing devices employing printing plates, such as stencils for printing addresses, and the operating devices of the tabulating machine to permit printing of suitable matter by the printing plates upon the perforated cards.

The present arrangement has the advantage that the printings from the plates may be effected in a certain sequence and in correspondence with the perforated cards passing through the machine so that the cards may be utilized for tabulating operations at the same time printing is being effected thereon, otherwise such operations would be required to be separate. The arrangement may be such that after each printing from a printing plate another plate may be employed for a subsequent printing operation. However, the printing plates could be selected for printing at the time the group classification of a series of cards change, or at any other convenient time, controlled either by the cards, printing plates or the operator.

If desired different forms of printing members may be used as the printing plates such as printing plates with impressed characters, printing plates with raised printing characters, stencil cards and matrices prepared by the photo-type process or other processes.

One mode of carrying out the present invention and its operation is shown by way of example on the accompanying sheets of drawings in which Fig. 1 shows the arrangement of the printing device combined with a tabulating machine controlled by perforated cards. Fig. 2 illustrates a perforated card. Fig. 3 is a sectional view taken through the longer dimension of the machine illustrating the card feeding devices and the stamping device for effecting the imprints prior to feeding the card to the analyzing devices shown.

Fig. 4 is a plan view of some of the parts shown in Fig. 3.

Fig. 5 is a sectional view taken through the printing devices showing the electrical control of the printing plate feeding devices.

Figure 6:
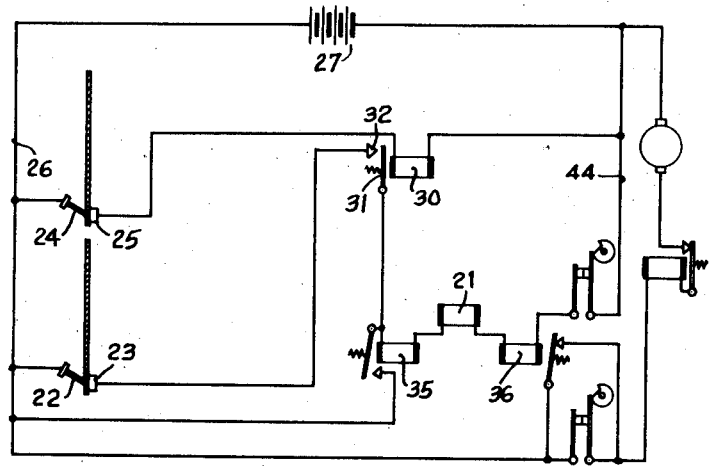
Figure 7:
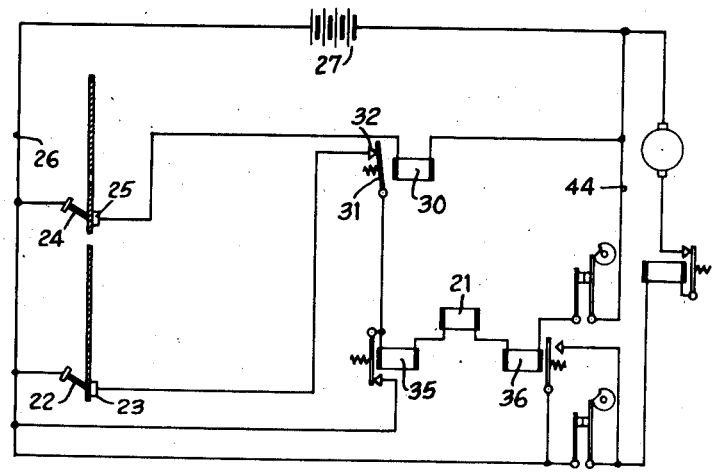

Figs. 6 and 7 each disclose diagrammatically a conventional form of group control device coordinated with the present improvement to control selectively the printing plate feeding mechanism.

The tabulating machine 1 is provided with a printing type magazine 2 from which the printing types 4 are removed singly by a gripper 3 and shifted over an inking ribbon 5 and guided by guides 6 into the path of movement of the perforated cards 7. The latter are removed singly from the staple hopper in a well known manner by an oscillating picker knife 8 to cooperate with the three sets of feeding rollers 9, which are simultaneously operated to feed the cards to and past the analyzing brushes 24 of the tabulating machine. A cam disc 10 is mounted on the shaft of one of the said sets of rollers and at a certain point in its revolution releases a printing head 11, which is subjected to the action a spring 12 and when released by cam 10 presses onto the card the printing type disposed below the head. The cam disc 10 operates synchronously with the movement of the card, so that every card moving past the printing head is imprinted at the same place.

The gripper 3 serves to change the printing types. This gripper is pivotally mounted on a lever 13 Fig. 5 and is forced by a spring 14 to engage the edge of the bottommost printing type 4 in the magazine 2. The lever 13 is shifted to feed a printing type 4 by a spring 15 and when the lever is released by a cam disc 16, which is operated by the shaft of one of the sets of feed roller 9 synchronously with respect to the movement of the card by means of a belt 17, a belt wheel 18 and a pair of bevel wheels 19, so that the gripper 3 is operated to feed a following printing type 4 below the printing head 11 after each feeding of a card beneath the printing head 11. The lever 13 can be retained in operative position by a catch 20 in case the change of the printing type has to take place at certain times only, for example, when the classification of groups of cards change. In such case the catch 20 releases the lever 13 only when it is subjected to the action of a magnet 21. The circuit of the magnet 21 can be controlled for energization of magnet 21 by any convenient means, for instance by the well known group-control device of tabulating machines or by a separate counter or by the known control-marks of the printing types and so forth.

The group control device alluded to in the above paragraph is more fully explained in the patent to Lake, 1,600,413 or to Hollerith 1,830,699 and the corresponding British Patent 117,985, and Figs. 6 and 7 herein are reproductions of Figs. 1 and 2 of Patent 1,830,699 and the British patent cited to show the coordination of the group control device and the selective control device and the selective control magnet 21.

Fig. 6 shows two cards of a group having like designations so that brush 24 engaging block 25 through the perforation of one card closes a circuit from line side 26 to magnet 30 to line side 44. Therefore, contacts 31—32 open and the circuit from line side 26 through a supplemental brush 22 engaging a block 23 through the corresponding perforation is broken at 31—32 to prevent energization of stick circuit magnet 35. magnet 21 and machine control relay magnet 36. The tabulating machine as more fully explained in the patent thereupon continues its operation so that the printing plate at printing position continues to print the same data on each card as long as card designations agree.

If the punched holes in successive cards do not agree, as indicated in Fig. 7, as brush 24 does not now engage block 25 when brush 22 engages block 23 magnet 30 will not be energized so that armature 31 will be engaging contact 32 when the circuit is closed through brush 22 and block 23, resulting in energizing magnets 35, 21 and 36.

As more fully explained in the patent the tabulating machine operation under such condition continues for a full cycle and during this operation a new printing plate 4 is fed into printing position. When tabulating is again resumed the last plate fed will print the same data upon successive cards as long as they are alike in their designations.

I claim:—

1. In a tabulating machine controlled by perforated cards to control tabulating operations, of feeding means for successively feeding printing plates in position to print on the cards, means for effecting printing from the plates, a group control device of the tabulating machine, and means controlled by the latter for selectively operating the feeding means in accordance with the change in card groups.

2. In a tabulating machine controlled by cards, a group control device therefor, means for individually feeding printing plates to printing position to print upon the cards, and means whereby the group control device controls the feeding means.

3. In a tabulating machine controlled by cards, means for feeding printing plates to printing position over the cards a group control device of the tabulating machine, means for restraining the operation of the feeding means, and means controlled by the group control device for disabling the restraining means when changing groups of cards.

GUSTAV TAUSCHEK.